(12) United States Patent
Beauchemin

(10) Patent No.: US 12,141,961 B2
(45) Date of Patent: Nov. 12, 2024

(54) METHODS AND ASSOCIATED SYSTEMS FOR DETERMINING COMPLIANCE OF A PART HAVING AN UNEVEN PROFILE WITH A REFERENCE DRAWING

(71) Applicant: VISIONX INC., Pointe-Claire (CA)

(72) Inventor: Patrick Beauchemin, Québec (CA)

(73) Assignee: VISIONX INC., Pointe-Claire (CA)

( * ) Notice: Subject to any disclaimer, the term of this patent is extended or adjusted under 35 U.S.C. 154(b) by 358 days.

(21) Appl. No.: 17/776,196

(22) PCT Filed: Nov. 13, 2020

(86) PCT No.: PCT/CA2020/051551
§ 371 (c)(1),
(2) Date: May 11, 2022

(87) PCT Pub. No.: WO2021/092696
PCT Pub. Date: May 20, 2021

(65) Prior Publication Data
US 2022/0392042 A1    Dec. 8, 2022

Related U.S. Application Data

(60) Provisional application No. 62/934,776, filed on Nov. 13, 2019.

(51) Int. Cl.
*G06T 7/00* (2017.01)
*G06T 7/33* (2017.01)
*G06T 7/62* (2017.01)

(52) U.S. Cl.
CPC ............ *G06T 7/001* (2013.01); *G06T 7/0006* (2013.01); *G06T 7/337* (2017.01); *G06T 7/62* (2017.01);

(Continued)

(58) Field of Classification Search
CPC . G06T 7/0002–001; G06T 7/62; G06T 7/337; G06T 7/0006; G06T 2207/30164
See application file for complete search history.

(56) References Cited

U.S. PATENT DOCUMENTS 8,780,223 B2    7/2014  Beauchemin
8,917,320 B2   12/2014  Beauchemin
(Continued)

FOREIGN PATENT DOCUMENTS

WO     2012129634 A4    10/2012

OTHER PUBLICATIONS

International Preliminary Report on Patentability received for PCT Application No. PCT/CA2020/051551, mailed on May 27, 2022, 7 pages.

(Continued)

*Primary Examiner* — Sean T Motsinger
(74) *Attorney, Agent, or Firm* — Shook, Hardy & Bacon L.L.P.; Elena K. McFarland

(57) ABSTRACT

There are provided a method and associated system for determining compliance of a part having teeth, crests or roots with a reference drawing. The method includes providing an image of the part; overlaying and aligning the reference drawing with the image of the part; analyzing the image of the part with the aligned overlay to extract a plurality of measurement points on the image of the part, each being associated with a corresponding crest or root of the teeth; and comparing the image of the part to the reference drawing in the crest or root regions to determine if the part is within a predetermined tolerance at each measurement point. The method is particularly suited for the inspection of parts having an uneven profile.

18 Claims, 10 Drawing Sheets

(52) U.S. Cl.
CPC .............................. *G06T 2200/24* (2013.01);
*G06T 2207/30164* (2013.01)

(56) References Cited

U.S. PATENT DOCUMENTS

| | | | |
|---|---|---|---|
| 9,292,915 B2 * | 3/2016 | Beauchemin | G01B 9/08 |
| 9,486,840 B2 | 11/2016 | Nygaard | |
| 2014/0074432 A1 * | 3/2014 | Chang | G01B 21/20 |
| | | | 702/167 |
| 2015/0161776 A1 * | 6/2015 | Beauchemin | G06T 7/60 |
| | | | 348/92 |

OTHER PUBLICATIONS

International Search Report issued in PCT/CA2020/051551, issued May 20, 2021, 4 pages.

Gadelmawla, E., S., "Computer vision algorithms for measurement and inspection of external screw threads", Measurement, Institute of Measurement and Control, vol. 100, pp. 36-49 (Dec. 2016).

Extended European Search Report and Opinion received for European Patent Application No. 20888087.2, mailed on Dec. 6, 2022, 9 pages.

* cited by examiner

METHODS AND ASSOCIATED SYSTEMS FOR DETERMINING COMPLIANCE OF A PART HAVING AN UNEVEN PROFILE WITH A REFERENCE DRAWING

TECHNICAL FIELD

The technical field generally relates to methods and associated systems for determining compliance of a part with a reference drawing, and more particularly concerns a method, as well as associated systems for automatically determining the compliance of a part having an uneven profile with a reference drawing.

BACKGROUND

Techniques for inspecting parts and, more particularly determining how a part compares to its computed-aided design (CAD) drawing or similar reference, are known in the art. However, existing techniques cannot be easily adapted to the inspection requirements of parts having an uneven, discontinuous and/or relatively non-smooth profile or external surface. For example, the specific inspection requirements of parts having teeth, crests, roots, or any types of discontinuities along their profile are generally poorly taken into account or considered by the existing techniques, thereby resulting in a relatively poor characterization of such parts. It therefore remains a challenge to identify if parts having an uneven profile comply with its associated reference drawing or not.

There is thus a need for techniques, methods and related systems that would address or at least alleviate some of the challenges presented above.

SUMMARY

In accordance with one aspect, there is provided a method for determining compliance of a part with a reference drawing and according to a predefined tolerance, the part having an uneven profile including roots and crests, the method including:
   providing an image of the part;
   overlaying the image of the part with the reference drawing;
   aligning the reference drawing with the image of the part;
   determining, on the image of the part, a position of at least one of the roots and crests along the uneven profile of the part;
   associating each position of said at least one of the roots and crests with a corresponding measurement point; and
   for each measurement point:
   determining a distance between the image of the part and the reference drawing;
   determining whether the distance falls within the predefined tolerance; and
   outputting the outcome of the determination.

In some embodiments, said aligning the reference drawing with the image of the part includes correcting a translation or a rotation of the reference drawing.

In some embodiments, said aligning the reference drawing with the image of the part is carried out by considering one or multiple datums.

In some embodiments, said aligning the reference drawing with the image of the part is achieved by carrying out an overall best-fit.

In some embodiments, said aligning the reference drawing with the image of the part is carried out by minimizing the distance between the reference drawing and the image of the part, according to a least square regression model.

In some embodiments, said aligning the reference drawing with the image of the part includes fitting at least some of the roots and crests within the predefined tolerance on the reference drawing.

In some embodiments, said aligning the reference drawing with the image of the part includes minimizing a maximal deviation between the roots or crests and the reference drawing.

In some embodiments, the method further includes refining an alignment of the reference drawing with the image of the part, based on a position of the reference drawing relative to the roots or the crests only.

In some embodiments, the distance between the image of the part and the reference drawing is measured between an edge of the part and a corresponding nominal position of the part.

In some embodiments, the reference drawing includes one or more nominal profiles.

In some embodiments, the method further includes associating each nominal profile with tolerance bands.

In some embodiments, each tolerance band includes plus-minus tolerances, plus-plus tolerances, minus-minus tolerances or any combinations thereof.

In some embodiments, the tolerance bands are constant along the uneven profile of the part.

In some embodiments, the tolerance bands vary along the uneven profile of the part.

In some embodiments, the tolerance bands vary linearly along the uneven profile of the part.

In some embodiments, the method further includes determining entities forming each nominal profile provided in the reference drawing.

In some embodiments, the method further includes determining a connectivity between the entities forming each nominal profile.

In some embodiments, said determining the position of said at least one of the roots and the crests includes:
   determining an edge profile of the image of the part;
   traversing the entities forming the nominal profile; and
   determining a variation in a distance measured between a part's nominal position on the reference drawing and a corresponding edge of the part on the image.

In some embodiments, the method further includes filtering artefacts based on a predetermined criterion.

In some embodiments, the artefacts include at least one of: electronic noise, contamination, and false peak.

In some embodiments, the reference drawing is a computer-aided design (CAD) drawing.

In some embodiments, the predefined tolerance is extracted from the reference drawing or provided by a user.

In some embodiments, the outcome of the determination is provided in real-time, near real-time, on a single image, on a series of images, or on a live video stream.

In some embodiments, said providing the image of the part includes generating the image of the part using a camera or a scanner.

In some embodiments, the method further includes displaying the image of the part and the reference drawing aligned therewith.

In some embodiments, the method further includes characterizing at least one property of the crests or roots.

In some embodiments, said property of the crests or roots includes tooth pitch, tooth spacing, tooth height, major diameter of the part and minor diameter of the part.

In some embodiments, the method further includes outputting an overall pass-or-fail determination, the overall pass-or-fail determination being based on a combination of the outcome of the determination made for each measurement point.

In some embodiments, the overall pass-or-fail determination is further based on the properties of said at least one of the roots and crests.

In some embodiments, the method further includes displaying, on the image of the part, the outcome of the overall pass-or-fail determination at said at least one of the roots and crests.

In some embodiments, the method further includes displaying, on the image of the part, the properties of said at least one of the roots and crests.

In some embodiments, the method further includes displaying, on the image of the part, the measurement points associated with said at least one of the roots and crests.

In some embodiments, the method further includes displaying, on the image of the part, the determined distance between the image of the part and the reference drawing.

In some embodiments, the method further includes displaying the outcome of the determination.

In accordance with another aspect, there is provided a method for determining compliance of a part with a reference drawing and according to a predefined tolerance, the part having an uneven profile including roots and crests, the method including:
  providing an image of the part;
  overlaying the image of the part with the reference drawing;
  aligning the reference drawing with the image of the part;
  determining, on the image of the part, a position of at least one of the roots and crests along the uneven profile of the part;
  associating each position of said at least one of the roots and crests with a corresponding measurement point;
  for each measurement point:
    determining a distance between an edge of the part on the image and a part's corresponding nominal position provided in the reference drawing;
    refining an alignment of the reference drawing with the image of the part, based on a position of the reference drawing relative to said at least one of the roots and crests only;
    determining a distance between the edge of the part on the image and the part's corresponding nominal position, after said refining the alignment;
    determining whether the distance falls within the predefined tolerance; and
    outputting the outcome of the determination; and
  characterizing one or more properties of said at least one of the roots and crests;
  outputting an overall pass-or-fail determination, the overall pass-or-fail determination being based on a combination of the outcome of the determination made for each measurement point or said one or more properties of said at least one of the roots and crests; and displaying the overall pass-or-fail determination.

In some embodiments, said one or more properties include at least one of tooth pitch, tooth spacing, tooth height, major diameter of the part and minor diameter of the part.

In accordance with another aspect, there is provided a system for comparing a part with a reference drawing, the part having an uneven profile including roots and crests, the system being configured for providing an image of the part, the system comprising a processor configured for determining compliance of the part with the reference drawing according to a predefined tolerance, the processor being configured for:
  overlaying the image of the part with the reference drawing;
  aligning the reference drawing with the image of the part;
  determining, on the image of the part, a position of at least one of the roots and crests along the uneven profile of the part;
  associating each position of said at least one of the roots and crests with a corresponding measurement point; and
  for each measurement point:
    determining a distance between the image of the part and the reference drawing;
    determining whether the distance falls within the predefined tolerance; and
    outputting the outcome of the determination.

In some embodiments, the processor may be configured to perform the methods, or any steps of the methods being herein disclosed.

In accordance with another aspect, there is provided a method for determining compliance of a part having teeth with a reference drawing, the method comprising:
  providing an image of the part;
  aligning the reference drawing with the image of the part;
  analyzing the image of the part to extract a plurality of measurement points on the image of the part, each being associated with a corresponding crest or root of the teeth; and
  comparing the image of the part to the reference drawing to determine if the part is within a predetermined tolerance at each measurement point.

In some embodiments, the step of aligning the reference drawing with the image comprises overlaying the image of the part with the reference drawing.

In some embodiments, the step of aligning or overlaying the the reference drawing comprises correcting the alignment of the drawing, based on the fit of the measurement points either within the tolerance band or to the nominal lines, and repeating the above steps of analyzing and comparing to obtain a final or more optimal result.

In accordance with another aspect, there is provided a method for checking the crest and root points of parts with teeth. Such a method allows determining if the points are in tolerance or within a tolerance band. The method can be implemented using a translation and rotation-invariant scheme, in which a step of locating the crest and root point of the part is followed by a step of associating with the crest and root points the corresponding position(s) and tolerance(s) on the CAD or reference drawing. The method according to this aspect allows carrying out a re-alignment using only these points (which is highly desirable for parts with teeth) and verifying other characteristics (e.g., tooth pitch, tooth height and the like).

In accordance with another aspect, there is provided a method comprising determining the connectivity of the entities (in the CAD drawing) that make up a profile's nominal position; providing cross-sections along the profile's nominal position; locating the edge of the part on each cross-sections; and analyzing this edge profile to locate (to sub-pixel accuracy) the crest & root points.

In accordance with another aspect, there is provided a non-transitory computer readable storage medium having stored thereon computer executable instructions for determining compliance of a part having teeth with a reference drawing, the computer executable instructions, when executed by a processor having received an image of the part, cause the processor to perform the following steps:

aligning the reference drawing with the image of the part;

analyzing the image of the part to extract a plurality of measurement points on the image of the part, each being associated with a corresponding crest or root of the teeth; and comparing the image of the part to the reference drawing to determine if the part is within a predetermined tolerance at each measurement point.

In some embodiments, the step of aligning the image comprises overlaying the image of the part with the reference drawing.

In some embodiments, the step of aligning or overlaying the reference drawing comprises correcting the alignment of the reference drawing, based on the fit of the measurement points either within the tolerance band or to the nominal lines, and repeating the above steps of analyzing and comparing to obtain a final or more optimal result.

Other features and advantages of the present description will become more apparent upon reading of the following non-restrictive description of specific embodiments thereof, given by way of example only with reference to the accompanying drawings.

DETAILED DESCRIPTION

Figure 1:
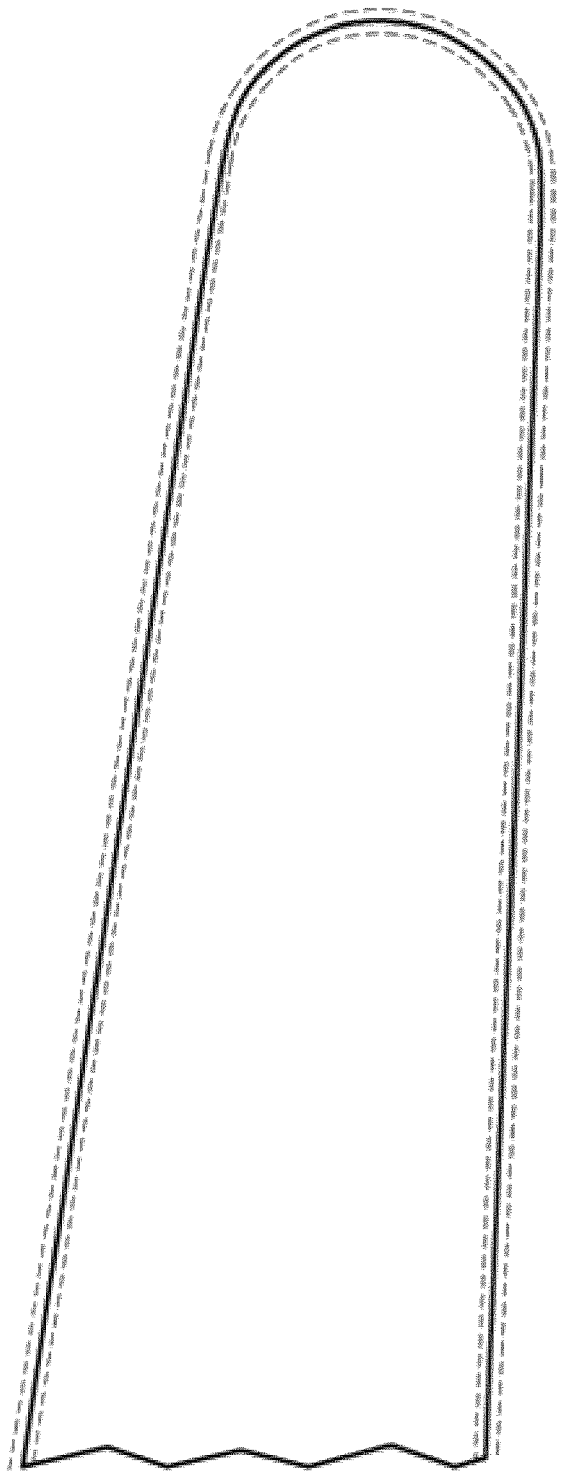
FIG. 1 (PRIOR ART) illustrates a hip stem being automatically compared to a reference drawing, wherein the hip stem has an even profile.

In the following description, similar features in the drawings have been given similar reference numerals or appellation, and, to not unduly encumber the figures, some elements may not be indicated on some figures if they were already identified in one or more preceding figures. It should also be understood herein that the elements of the drawings are not necessarily depicted to scale, since emphasis is placed upon clearly illustrating the elements and structures of the present embodiments.

The terms "a", "an" and "one" are defined herein to mean "at least one", that is, these terms do not exclude a plural number of elements, unless stated otherwise. It should also be noted that terms such as "substantially", "generally" and "about", that modify a value, condition or characteristic of a feature of an exemplary embodiment, should be understood to mean that the value, condition or characteristic is defined within tolerances that are acceptable for the proper operation of this exemplary embodiment for its intended application.

In the present description, the terms "connected", "coupled", and variants and derivatives thereof, refer to any connection or coupling, either direct or indirect, between two or more elements. The connection or coupling between the elements may be mechanical, acoustical, physical, optical, operational, electrical, wireless, or a combination thereof.

It will be appreciated that positional descriptors indicating the position or orientation of one element with respect to another element are used herein for ease and clarity of description and should, unless otherwise indicated, be taken in the context of the figures and should not be considered limiting. It will be understood that spatially relative terms (e.g., "outer" and "inner", and "top" and "bottom") are intended to encompass different positions and orientations in use or operation of the present embodiments, in addition to the positions and orientations exemplified in the figures.

Broadly described, the technology relates to techniques for determining if a part having an uneven profile is within a predetermined tolerance, based on a computer-aided design (CAD) drawing or any other reference drawings or files. It will be noted that in the context of the current disclosure, the expression "uneven profile" refers to an external surface of a part which includes at least one root and/or crest, in contrast to a relatively even profile, which would not include such roots and/or crests. Of note, the expressions "uneven profile" and "discontinuous profile" may be interchangeably used throughout the current description. Similarly, the expressions "even profile", "smooth profile" and "continuous profile" could also be interchangeably used in the current disclosure.

Figure 2:
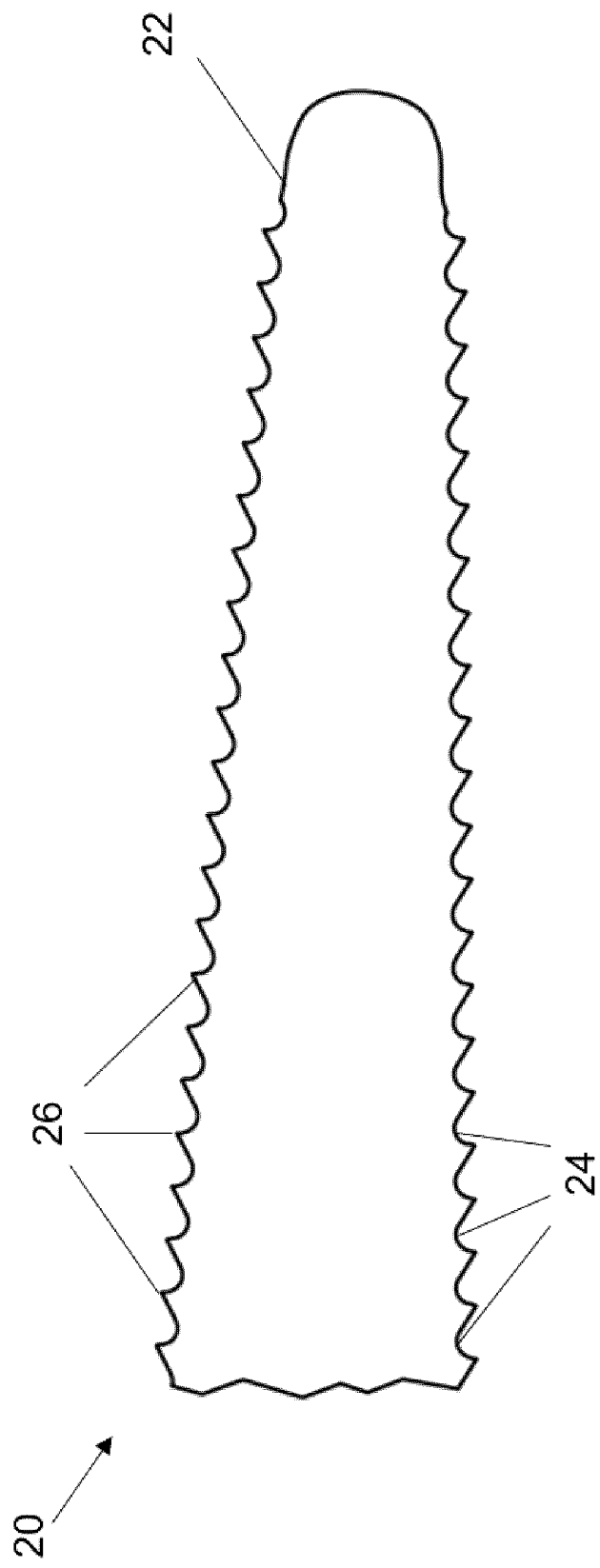
FIG. 2 is an image of a medical rasp, which can be obtained and characterized with one embodiment of the method, wherein the medical rasp has an uneven profile comprising roots and crests.

Known approaches, such as the ones presented in U.S. Pat. Nos. 8,780,223, 8,917,32 0 and 9,292,915, can be used to compare a part to its reference file, for example by aligning the part's nominal profile with an image of a part being characterized, and verifying if the part being characterized is within a prescribed tolerance band along an entirety of the profile of the part, as depicted in FIG. 1 (PRIOR ART). However, parts having an uneven profile, i.e., parts that include roots and/or teeth, an example of which is illustrated in FIG. 2, are typically subject to different inspection requirements. In accordance with a broad aspect, there are provided techniques that are well adapted to automatically determine if a part having an uneven profile falls within a predefined tolerance at the portions of the uneven profile where the roots and crests are positioned. Of note, in the case of parts having an uneven profile, it would be advantageous to evaluate if the crests and/or the roots (i.e., the extrema points themselves) are within prescribed or predetermined tolerance band(s) around the crest and root nominal lines only, without any regard for the rest of the part (i.e. the non-extrema portions of the part). The methods and associated systems that will be presented herein, which notably rely on a comparison with a reference drawing such as a CAD drawing or a reference file, allow achieving such an objective of specifically determining if the crest(s) and/or root(s) forming the uneven profile fall within a predefined tolerance.

Now turning to FIGS. 2 to 10, different embodiments of a method for determining compliance of a part 20 with a reference drawing and according to a predefined tolerance will be described. As it has been previously described, and as illustrated in FIG. 2, the part 20 being characterized using the method that is herein disclosed has an uneven profile 22, which includes one or more roots 24 and crests 26. In some embodiments, the predefined tolerance is extracted from the reference drawing or may be provided by a user.

The method includes a step of providing an image of the part 20. The step of providing the image of the part 20 may include generating the image using a camera or a scanner. Such a step may also be referred to as a step of capturing the image. One skilled in the art would readily understand that the step of capturing the image could be performed using a camera or a similar device.

The step of providing the image of the part 20 is followed by a step of overlaying the image of the part 20 with the reference drawing. It is generally desirable, during this step, to reduce the distance between some points of the part 20 and the reference drawing during said overlaying.

The step of overlaying the image of the part 20 with the reference drawing is followed by a step of aligning the reference drawing with the image of the part 20. In some embodiments, said aligning the reference drawing with the image of the part 20 includes correcting a translation or a rotation of the reference drawing. Aligning the reference drawing with the image of the part 20 may be achieved, for example and without being limitative, by considering one or multiple datums, carrying out an overall best-fit, minimizing the distance between the reference drawing and the image of the part 20, according to a least square regression model, fitting at least some of the roots and crests within the predefined tolerance on the reference drawing, minimizing a maximal deviation between the roots or crests and the reference drawing, any combinations thereof, and/or any relevant techniques.

In some embodiments, the reference drawing may be aligned with the image of the part 20 in order to meet a predetermined criterion, such as, for example and without being limitative, least squares distance between the nominal geometry of the part 20 (i.e., its ideal profile) and the actual geometry of the part 20.

In some embodiments, the method may include refining an alignment of the reference drawing with the image of the part 20, based on a position of the reference drawing relative to the roots 24 or the crests 26 only. In some embodiments, the method may include displaying the image of the part 20 and the reference drawing aligned therewith.

Figure 3:
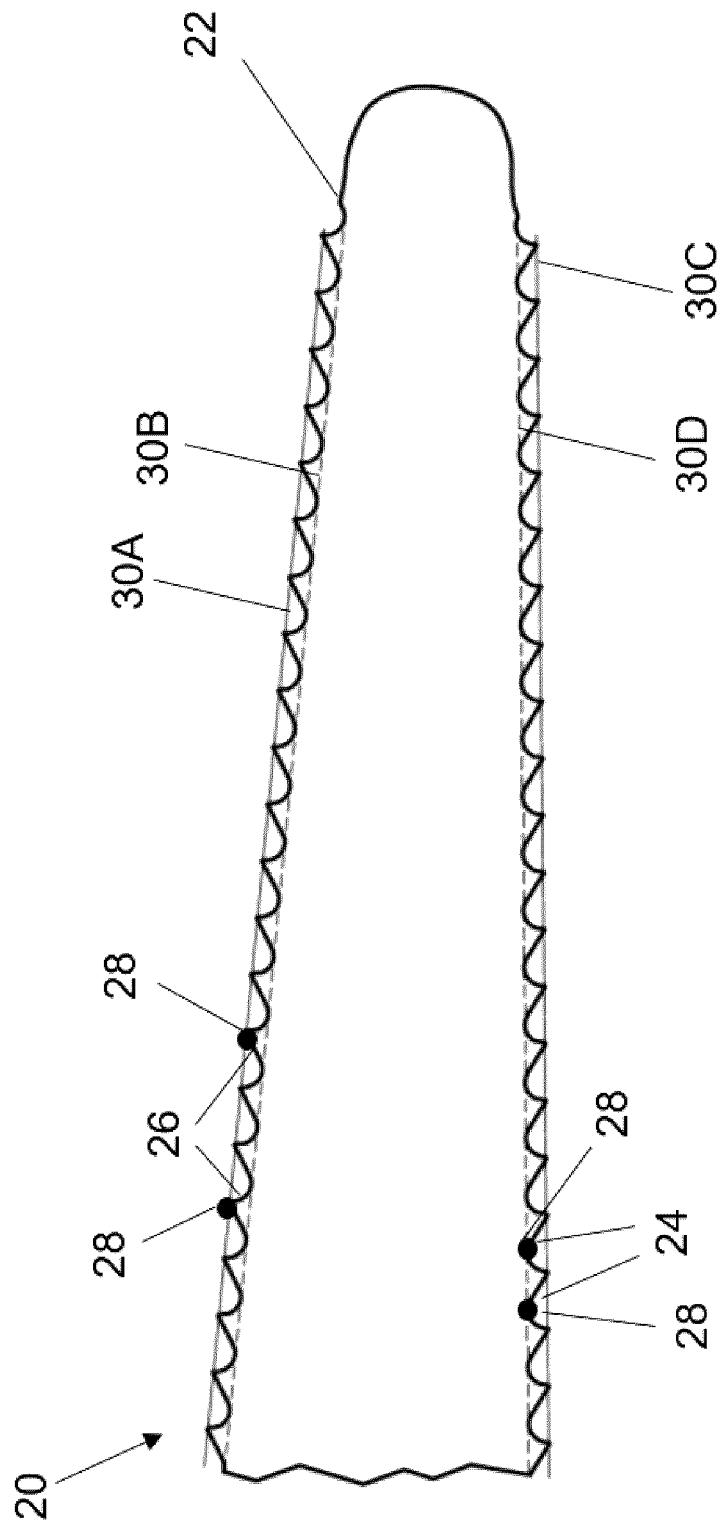
FIG. 3 illustrates the medical rasp of FIG. 2 with nominal lines passing through crests and roots of the teeth overlaid thereon.

Once the step of aligning the reference drawing to the image of the part 20 is achieved, the method includes a step of providing a plurality of measurement points 28 on the image of the part 20. In this regard, the method includes determining, on the image of the part 20, a position of at least one of the roots 24 and crests 26 along the uneven profile 22 of the part 20. This step allows identifying the position of the crest(s) 26 and/or the root(s) 24 along the outer perimeter of the part 20. The method subsequently includes associating each position of said at least one of the roots 24 and crests 26 with a corresponding measurement point 28, as illustrated in FIG. 3. A step of comparing the image of the part 20 to the reference drawing to determine if the part 20 is within a predetermined or predefined tolerance for each measurement point 28 can then be carried out. More specifically, the method includes determining a distance between the image of the part 20 and the reference drawing, determining whether the distance falls within the predefined tolerance and outputting the outcome of the determination. Different embodiments of such determination will be described in greater detail below.

In some embodiments, the distance between the image of the part 20 and the reference drawing is measured between an edge of the part 20 and a corresponding nominal position of the part 20.

In some embodiments, such as the one illustrated in FIG. 3, the reference drawing includes one or more nominal profiles 30. In FIG. 3, four nominal profiles (or lines) are provided, respectively labeled 30A, 30B, 30C and 30D. For instance, the CAD drawing or reference file may contain nominal lines of the crest(s) and/or root(s) of the teeth of the part 20. In these embodiments, and as better exemplified in FIG. 4, the method may include associating each nominal profile 30 with tolerance bands 32A, 32N, . . . , 32N (globally referred to as the tolerance bands 32), wherein N is the number of tolerance bands being provided.

It is to be noted that each one of the tolerance bands 32 may include plus-minus tolerances, plus-plus tolerances, minus-minus tolerances, or any combinations thereof. In some embodiments, the tolerance bands 32 are constant along the uneven profile 22 of the part 20. In other embodiments, the tolerance bands 32 vary along the uneven profile 22 of the part 20. For example, and without being limitative, the tolerance bands 32 may linearly vary along the uneven profile 22 of the part 20. In the embodiment illustrated in FIG. 4, four tolerance bands 32A, 32B, 32C and 32D, each being associated with a corresponding one of the four nominal profile 30A, 30B, 30C and 30D.

In some embodiments, the method may include determining entities forming each nominal profile 30 provided in the reference drawing. In such embodiments, the method may also include determining a connectivity between the entities forming each nominal profile 30.

In some embodiments, determining the position of said at least one of the roots 24 and the crests 26 includes determining an edge profile of the image of the part 20, traversing the entities forming the nominal profile 30 and determining a variation in a distance measured between a part's nominal position on the reference drawing and a corresponding edge of the part 20 on the image.

In one embodiment, there is provided a step of providing the nominal crest line and the nominal root line in the reference drawing. This step can include determining the continuity of the nominal crest and root lines. This information can be used to determine the edge profile of the image of the part 20 and then the edge profile can be traversed. Based on the deviation of the edge profile from the reference drawing nominal lines, a step of determining the tooth profile can be carried out. The method then includes analysing the tooth profile to locate the crest 26 and root 24 points and verifying that these crest 26 and root 24 points are within a tolerance band 32 for each one of the crests 26 and each one of the roots 24 (rather than along the entire perimeter of the part), thereby determining if the part 20 falls within the tolerance band. These steps can be carried out in real-time, near real-time or on a live video stream.

In some embodiments, the method may include filtering artefacts based on a predetermined criterion. Nonlimitative examples of artefacts include electronic noise, contamination, and false peak.

In some embodiments, the outcome of the determination may be provided in real-time, near real-time, on a single image, on a series of images, or on a live video stream.

Figure 6:
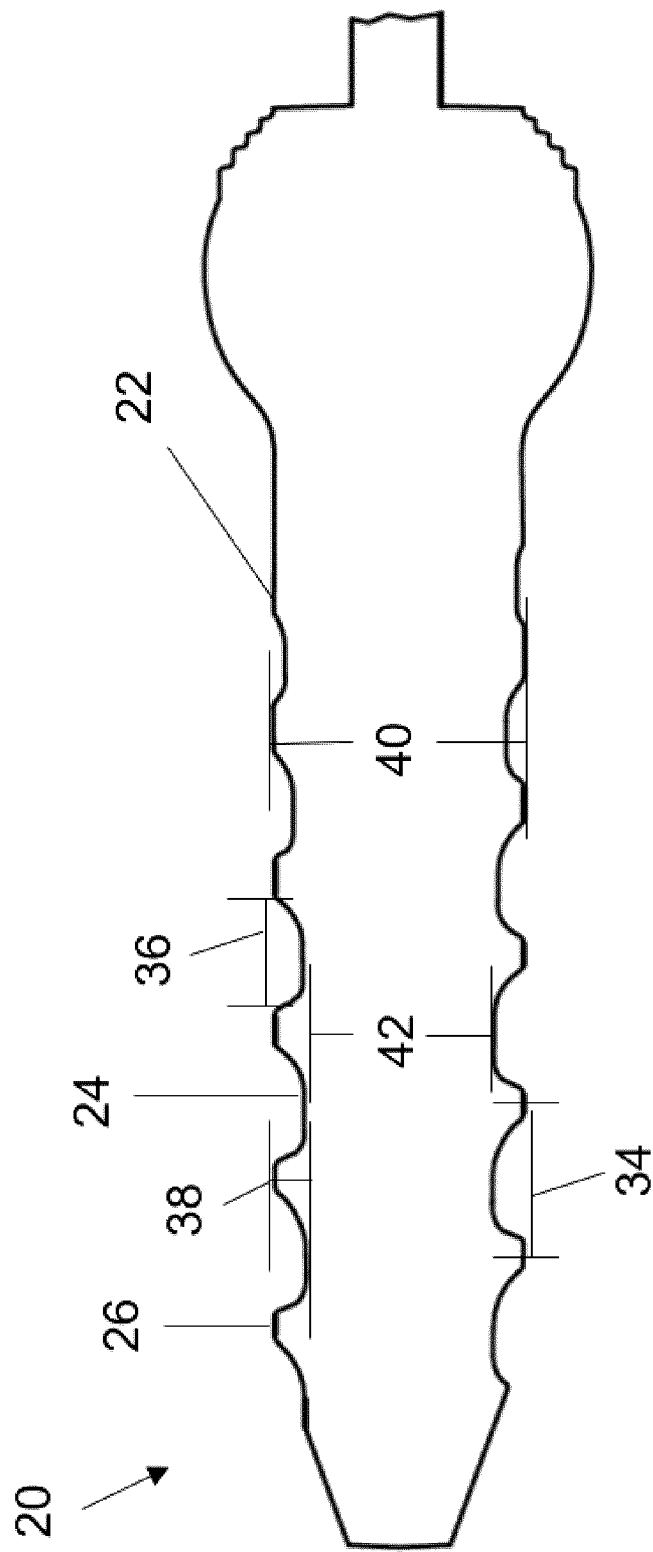
FIG. 6 shows an image of a part and illustrates different features and characteristics of the part.

In some embodiments, the method further includes characterizing at least one property of the crests or roots. Nonlimitative examples of such properties are tooth pitch 34, tooth spacing 36, tooth height 38, major diameter 40 of the part 20 and minor diameter 42 of the part 20, as illustrated in FIG. 6.

In some embodiments, the method further includes outputting an overall pass-or-fail determination, the overall pass-or-fail determination being based on a combination of the outcome of the determination made for each measurement point 28. The overall pass-or-fail determination may be based on the properties of said at least one of the roots 24 and crests 26.

Depending on the inspection requirements, the method may be adapted to display different types of information. In some embodiments, the method may include displaying, on the image of the part 20, the outcome of the overall pass-or-fail determination at said at least one of the roots 24 and crests 26. The method may also include displaying, on the image of the part 20, the properties of said at least one of the roots 24 and crests 26. The method may also include displaying, on the image of the part 20, the measurement points 28 associated with said at least one of the roots 24 and crests 26. The method may also include displaying, on the image of the part 20, the determined distance between the image of the part 20 and the reference drawing. The method may also include displaying the outcome of the determination.

The technology herein described can be useful, for example and without being limitative, in instances where it is not a part's entire profile that needs to be checked, but rather its extrema points. The crests 26 and roots 24 only serve a purposive example of extrema points, and the current technique could be applied to other types of extrema points. Also, it is to be noted that a CAD drawing is generally made up of multiple entities, so a profile's "nominal position" drawing could be made up of many (connected) entities. Different types of entities exist, including, but not limited to lines, circular arcs, elliptical arcs, splines, and the like.

Other aspects of the technology will now be described.

Figure 5:
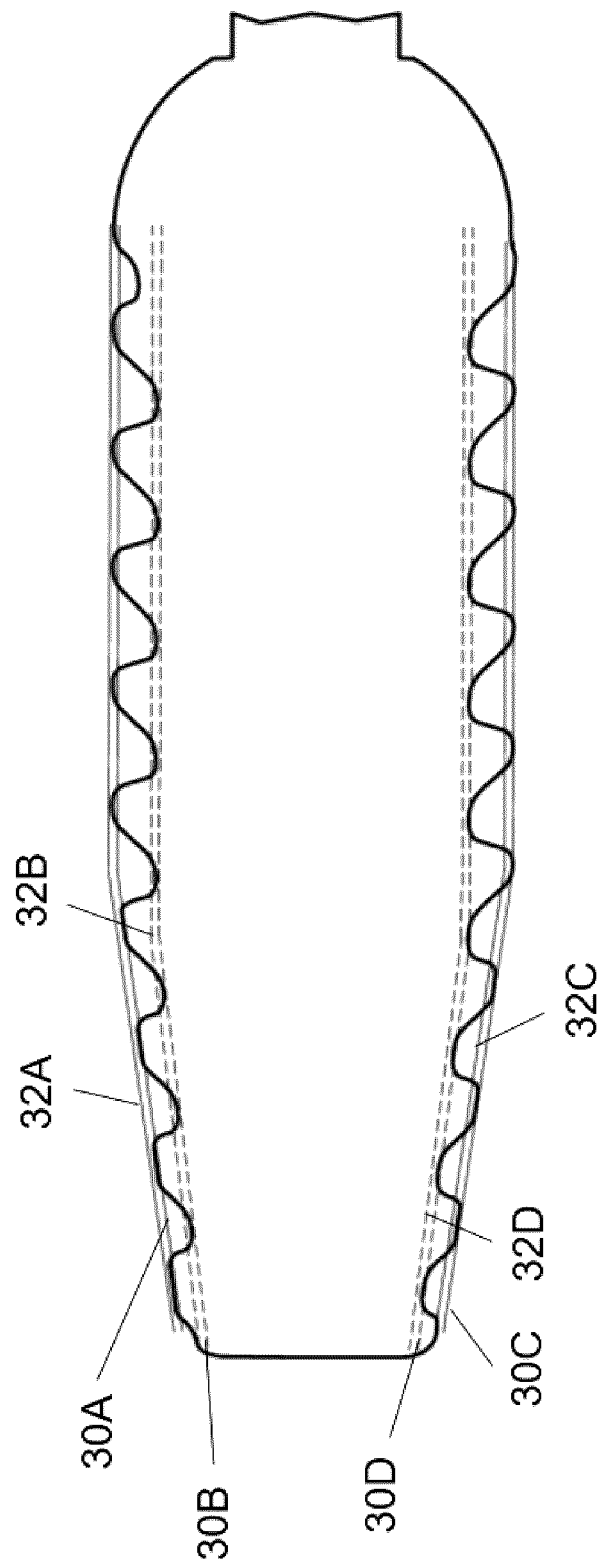
FIG. 5 is an illustration of a bone screw with tolerance bands with the crests and the roots of its teeth.

FIG. 2 shows that the part 20 may be embodied by a medical rasp. Of course, one would have readily understood that there are many other examples of parts that present an uneven profile 22 with teeth, such as, for example and without being limitative, screws, fluted instruments and gears. For example, FIG. 5 shows a bone screw. It is to be noted that in the example of FIG. 5, the tolerance bands 32 for the crests 26 and roots 24 of its teeth are overlaid on the image of the bone screw.

Figure 4:
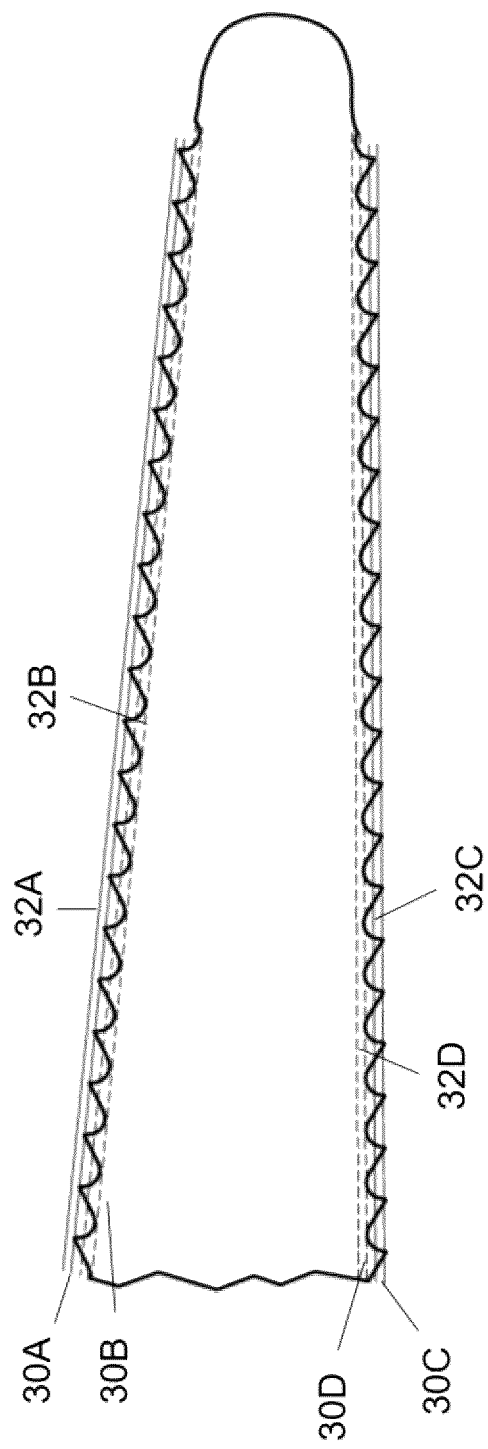
FIG. 4 shows the medical rasp of FIG. 2 with tolerance bands provided around the nominal lines of the crests and roots of the teeth of FIG. 3.

Now turning back to FIG. 3, nominal lines 30A, 30B, 30C and 30D for the maximum and minimum position of the profiles are shown. As illustrated, the nominal lines 30A-D are associated with corresponding crests 26 and roots 24 of the teeth, and more particularly pass by each one of the crests 26 and roots 24. In FIG. 4, the tolerance bands 32 have been added around these nominal lines 30A-D, as presented above. FIG. 4 illustrates one of the advantages of the technology being herein described over the known techniques, in that previously developed approaches check that the part 20 is within the tolerance bands along an entire length of the profile, which would be maladapted for profiles such as these with teeth (and where only the extreme crest and root points need to fall within the tolerance band), and would therefore systematically fail all parts 20 that have teeth, even those that are good. In the current approach, the fact that the crests 26 and roots 26 are located and that the evaluation is carried out at the crests 26 and roots 24 of the teeth only (i.e., the measurement points 28) alleviates or at least minimize this challenge.

The current approach does not rely on drawing, tracing and/or analyzing the full profile of the parts having teeth, as it would not apply the appropriate test, i.e., it would verify the entire part's profile, and not just that of the crest and root points, contrary to what is required by the specifications. From a practical point of view, it would require a great effort to align the part 20 with the reference drawing. In one example, pertaining to bone screws, the position of the teeth in the image moves, either left or right, as the screw rotates about its lengthwise axis. One possibility would be to "clock" the screw correctly to be able to compare it to a full part 20 profile. However, in that situation, one would only have verified that specific "clocking". In order to ensure that the teeth are within tolerance at another "clocking" of the screw, a different profile would need to be used. Such an approach would not only fail to meet the specifications but would be highly impractical as well. As such, evaluating the deviation between the part 20 and the reference drawing in the crests and roots only allows getting rid of the aforementioned problems.

In some embodiments, the method can be considered as being a CAD Auto-Pass/Fail™ tooth checking tool, and so can be compatible with the CAD Auto-Pass/Fail™ technology.

It is to be noted that the techniques presented herein make no assumption as to the part 20 orientation, i.e., there is no added limitation in this regard.

Figure 7:
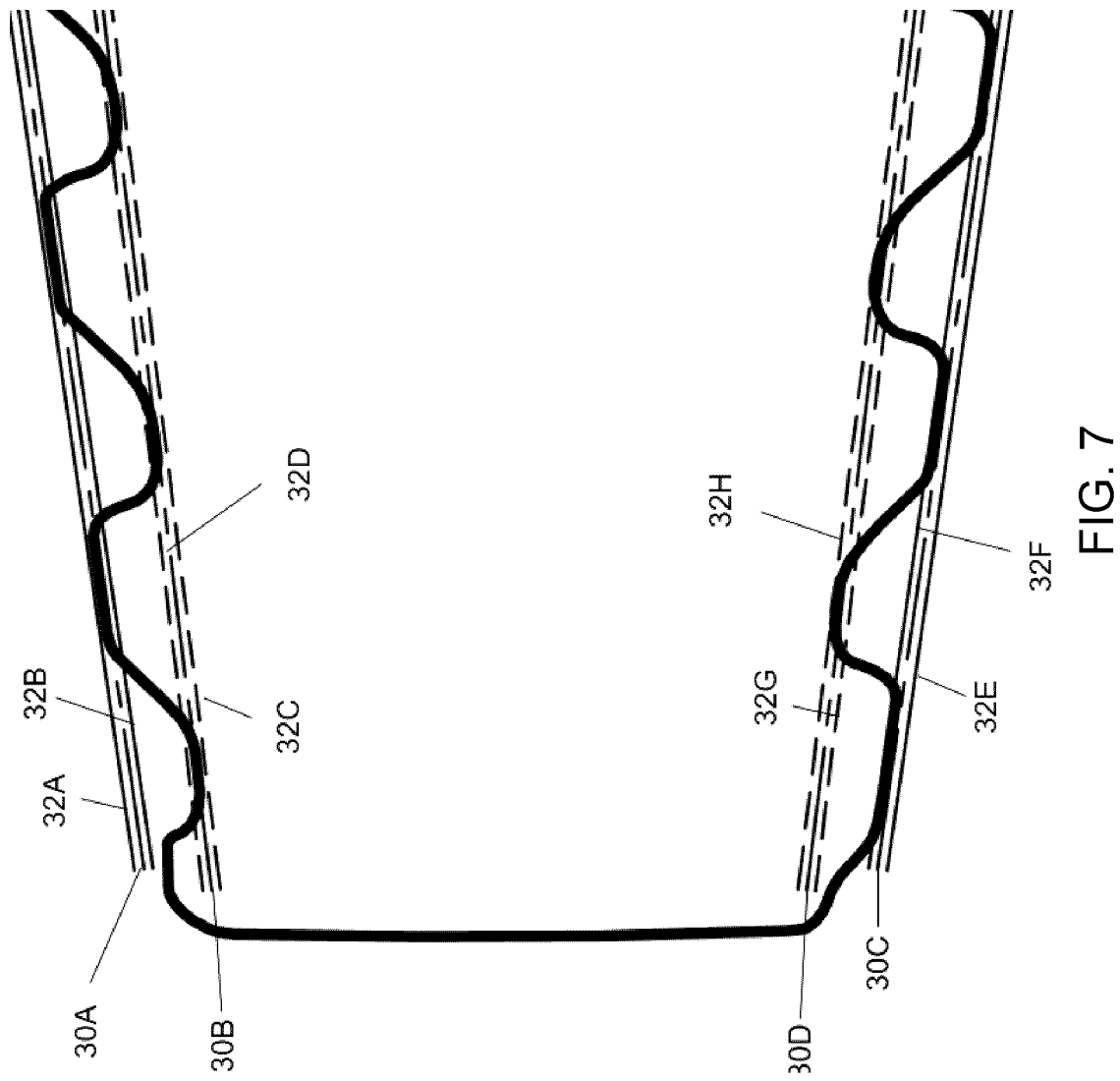
FIG. 7 is an illustration of a crests and roots inspection of a part.

FIG. 7 illustrates a closeup view of a general case in which there are four nominal lines, and the inspection includes verifying the top and bottom profiles of the part 20, but only in the crests 26 and roots 24 regions of the teeth. The nominal lines 30A,B of the top profile are associated with corresponding tolerance bands 32A-D and the nominal lines 30C,D of the bottom profile are associated with corresponding tolerance bands 32E-H. Such an example could be referred as a "crest and root" inspection and is compatible with the different embodiments of the technique which have been described so far. In this general case, the method is carried out to verify, for both the top and the bottom profiles, that the tip (i.e., top or crest 26) of each tooth is within the outer tolerance band and also that the low point between neighboring teeth (i.e., bottom or root 24) also falls within the inner tolerance band.

In some embodiments, the method can be adapted to handle cases wherein the user is only concerned with the tip (i.e., top or crest 26) of each tooth. It would also be possible to check only the roots 24.

In some embodiments, the method can be fully automated (fully automated mode). In other embodiments, the method can be operated in a manual mode.

Once all these steps have been carried out, a step of outputting the result is achieved. For example, and without being limitative, the method can be adapted to display the results, e.g., PASS/FAIL or the deviation from nominal 30 of the crest(s) 26 and/or root(s) 24, on a screen. In some embodiments, the results can be exported. Once displayed, an optional step of indicating where the part 20 passes (e.g., by default in green) and/or where it fails (e.g., by default in red) can be performed.

As indicated above, the method generally includes identifying if the parts 20, and more particularly their crests 26 and roots 24, fall within predetermined tolerances. As such, in some embodiments, the method includes the step of defining the various tolerance bands 32. In some instances, there could be multiple profiles or different of the outer perimeter of the part 20 to inspect, each potentially with either one or two tolerance bands 32. For example, the applications shown in FIG. 7 has a top profile and bottom profile, one for each side of the part 20. FIG. 7 illustrates the case in which two tolerance bands 32 are associated with each of the nominal profiles 30A-D (i.e. an upper tolerance band and a lower tolerance band per profile).

Figure 8:
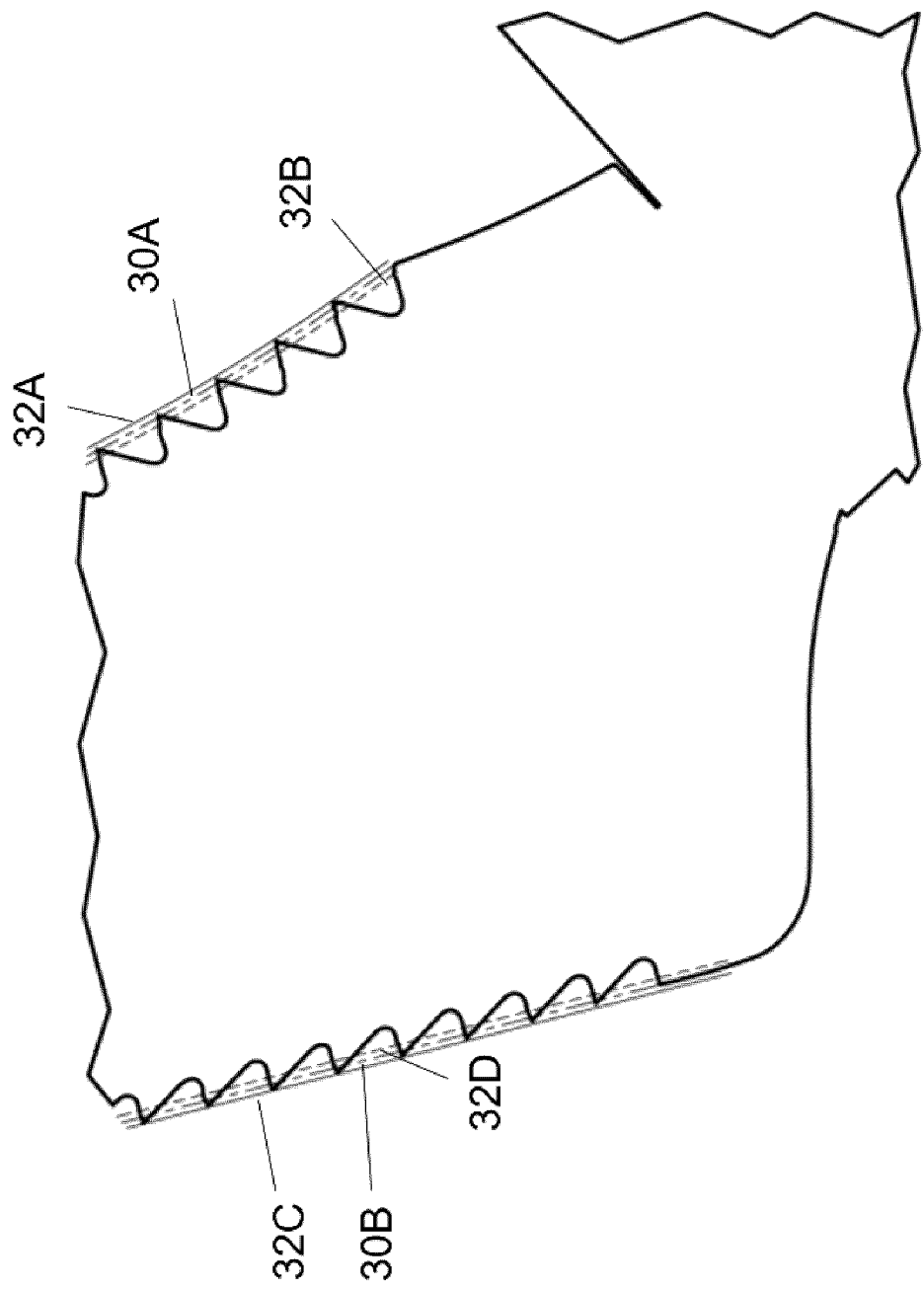
FIG. 8 is an illustration of a crests inspection of another part.

FIG. 8 illustrates an exemplary embodiment in which only the crests 26 are associated with a corresponding nominal profile 30A, 30B, and wherein two tolerance bands 32A,B and 32C,D, corresponding to upper and lower tolerance bands, are provided. Of course, in FIG. 8, tolerance bands could also have been associated with the roots 24 of the teeth.

Prior to this step, when a nominal profile is composed of multiple segments (sometimes referred to "entities") there is performed a step of determining which entities, when combined together, define a nominal profile, as it has been already presented above.

Figure 9:
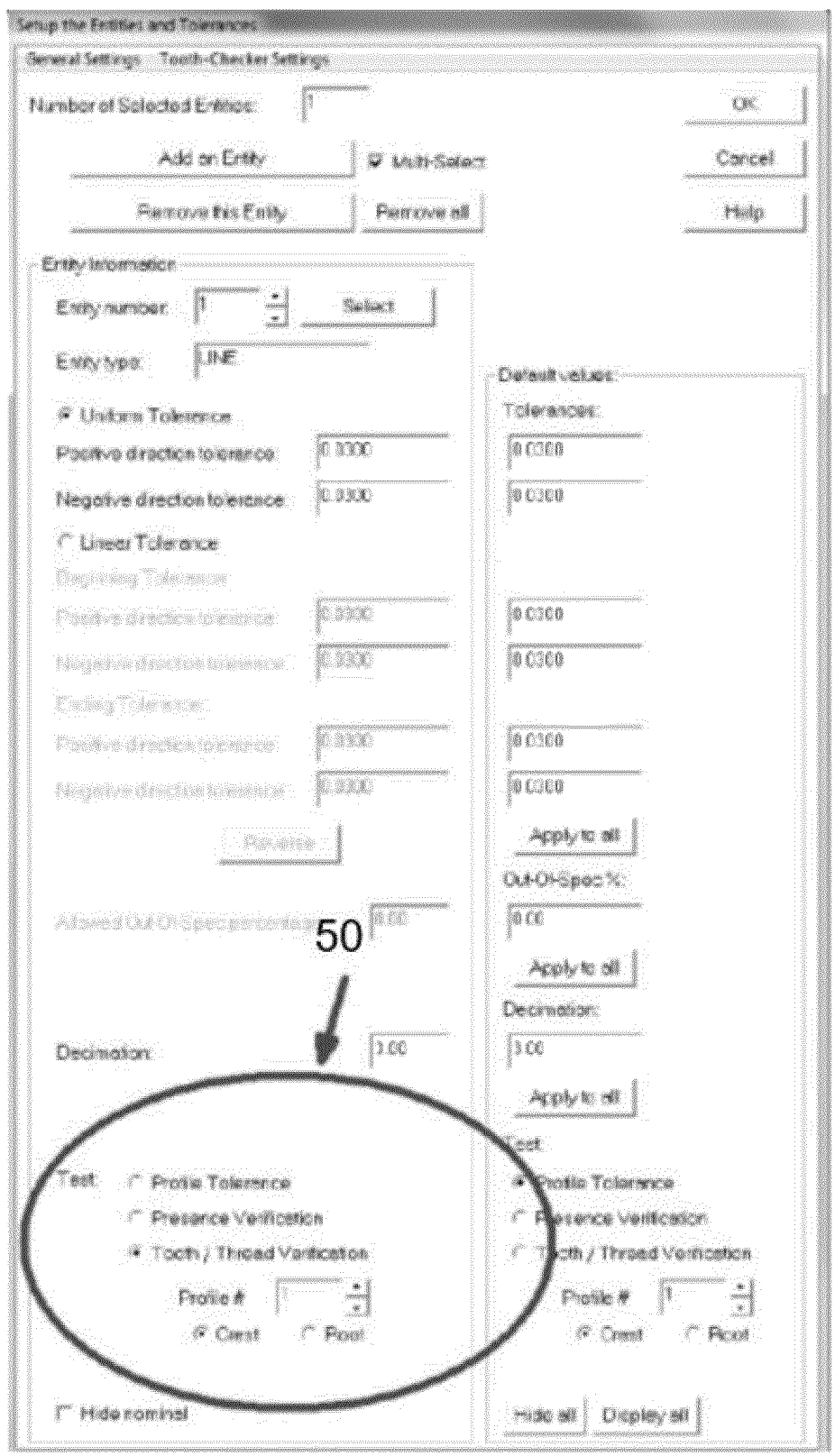
FIG. 9 shows a user-interface that can be used in a method for determining compliance of a part having teeth with a reference drawing, in accordance with one embodiment.

In some embodiments, the user can indicate in the software executing the method that that a portion of the part 20 (an entity) should undergo a "tooth/thread checker" test and on which profile the crests or roots are located (i.e. either the top profile or the bottom profile). A nonlimitative example of the user interface that can be provided to the user is illustrated in FIG. 9, which presents a screen capture of the user-interface to setup the entities, comprising the menu 50 through which the user can select and activate the tooth/thread verification.

Once the step of defining the various tolerance bands has been carried out, the method can include a preprocessing step, including calculations to be carried out once the entities are defined, previous to the evaluation of the compliance of the crests or roots. This can be done once, before the runtime calculations (i.e., the evaluation of the compliance) are carried out. In this step, the connection between the entities along each profile can be investigated and characterized.

In order to understand how the entities are connected along a profile (i.e., the "entity connectivity"), a step of determining the extreme points of the overall profile can be performed. The extreme points could be two points on the profile that are the furthest from each other. Once the extreme points are determined, a step of determining the link or the path along the profile's entities connecting the extreme points can be carried out.

Once the abovementioned steps have been completed, the runtime calculations can be performed. These calculations include capturing an image of the part 20 overlaying or aligning the CAD to the image of the part 20, providing cross sections to the instrument's full resolution along all of the entities that make up the profile. In some embodiments these cross-sections are normal to the entities and, using a search range and an edge threshold, the identification to sub-pixel accuracy of the position of the part's edge at this cross-section can be achieved. In some embodiments, the edge point at every cross section is kept in memory for subsequent analysis.

As it has been previously mentioned, parts having teeth need to be treated differently from parts having relatively smooth edges or profiles. Indeed, normal profile verification would consider the part 20 as a whole. For the parts having teeth, during the calculations, the edge position is determined, the deviation from nominal and the pass/fail result at all of the cross-sections of the crests and/or roots is evaluated, but the pass/fail result at points other than at the crest and/or roots is not considered.

Once the edge position has been identified at every cross section along all of a profile's entities, then, afterwards, a supplementary calculation step wherein each of the profiles are considered. In one embodiment, four profiles are considered: a top profile for the crests, a top profile for the roots, a bottom profile for the crests and a bottom profile for the roots.

More particularly, this step includes traversing each profile in the manner presented above, i.e., starting at one of the profile's extreme points and, based on the connectivity presented above, following the path of entities to reach the profile's other extreme point.

During this step, by analyzing the sequence of edge points on all of the cross sections, the crest points on the crest profiles and the root points on the root profiles are identified, followed by an evaluation of their compliance having regard to the predetermined tolerance. The method can be adapted to consider threshold values that are designed to prevent declaring small artefacts and point defects, such as, for example and without being limitative, small contamination or electronic noise, as "false peaks". In this way, we can require that the "height" of crests points or the "depth" of root points be greater than a given value (or a predetermined value).

In one embodiment, the method is adaptive and could include that, at every point, a minimal crest height and a minimal root depth be greater than a fraction of the total tolerance band. This can be achieved through the use of an adaptive thresholding coefficient.

One embodiment of the algorithm for finding all of the crests includes the following steps:

```
MinPre = Val
MinPost = Val
Max = Val
PeakHeightPre = Max - MinPre
PeakHeightPost = Max - MinPost
Repeat
{
   Move to the next point.
   If (Val >= Max) // A step of "climbing"
      {
         Max = Val
      PeakHeightPre = Max - MinPre
      MinPost = Val
      PeakHeightPost = Max - MinPost // Equivalent as saying = 0
      }
      Else // Val < Max
      {
   If (PeakHeightPre = 0) // A peak has been not found yet
   {
      MinPre = Val
      MinPost = Val
      Max = Val
      PeakHeightPre = Max - MinPre
      PeakHeightPost = Max - MinPost
   }
   Else
   {
      If (Val < minPost) // A step of "going downhill"
      {
         minPost = Val
         PeakHeightPost = Max - MinPost
      }
      If ((PeakHeightPre > MaxThreshold) &&
         (PeakHeightPost > MaxThreshold))
         {
            // The previous Max Pos is identified as a crest
            // The information is stored
            // A step of looking for the next crest
```

```
        MinPre = Val
        MinPost = Val
        Max = Val
        PeakHeightPre = Max - MinPre
        PeakHeightPost = Max - MinPost
      }
      Else
      {
        If (MinPost <= MinPre)
        {
          // Move everything over
          MinPre = Val
          MinPost = Val
          Max = Val
          PeakHeightPre = Max - MinPre
          PeakHeightPost = Max - MinPost
        }
      }
    }
  }
}
```

These steps are performed until there are no more points, i.e., until the entire profile has been traversed, based on its connectivity.

One embodiment of the algorithm for finding all of the roots includes the following steps:

```
MinPre = Val
MinPost = Val
Max = Val
PeakHeightPre = Max - MinPre
PeakHeightPost = Max - MinPost
Repeat
{
  Move to the next point.
  If (Val <= Max) // A step of "descending"
  {
    Max = Val
    PeakHeightPre = Max - MinPre
    MinPost = Val
    PeakHeightPost = Max - MinPost // Equivalent as saying = 0
  }
    Else // Val > Max
    {
  If (PeakHeightPre = 0) // A root has not been found yet
  {
    MinPre = Val
    MinPost = Val
    Max = Val
    PeakHeightPre = Max - MinPre
    PeakHeightPost = Max - MinPost
  }
  Else
  {
    If (Val > minPost) // A step of "going uphill"
    {
      minPost = Val
      PeakHeightPost = Max - MinPost
    }
    If ((PeakHeightPre > -MaxThreshold) &&
       (PeakHeightPost > -MaxThreshold))
        {
          // The previous Max Pos is identified as a root
          // The information is stored
          // A step of looking for the next root
          MinPre = Val
          MinPost = Val
          Max = Val
          PeakHeightPre = Max - MinPre
          PeakHeightPost = Max - MinPost
        }
        Else
        {
          If (MinPost >= MinPre)
          {
            // Move everything over
            MinPre = Val
            MinPost = Val
            Max = Val
            PeakHeightPre = Max - MinPre
            PeakHeightPost = Max - MinPost
          }
        }
      }
    }
  }
}
```

These steps are performed until there are no more points, i.e., until the entire profile has been traversed, based on its connectivity.

In the above embodiments of the algorithm, "Val" is the deviation from the nominal geometry at the current cross section. Because it is the deviation from the nominal geometry at each cross section that is analyzed to locate the crest and root points, the method is not affected by the part's orientation (i.e., independent from the orientation of the part).

Once the crests have been identified in the manner presented above, then each crest is evaluated to ensure that they are all points where the profile passed the test, i.e., is within the tolerance band. A similar approach is performed for the roots. It is to be noted that each measurement point is associated with one of the crests or roots of the teeth.

Once the inspection is complete, the result can be outputted in different forms. For example, and without being limitative, the computed edge can be displayed, the pass/fail results at the various extrema points can be displayed, the extrema points (i.e., crests and/or roots) can be displayed, the part's deviation from nominal at the various extrema points can be displayed, or any other informative results.

Figure 10:
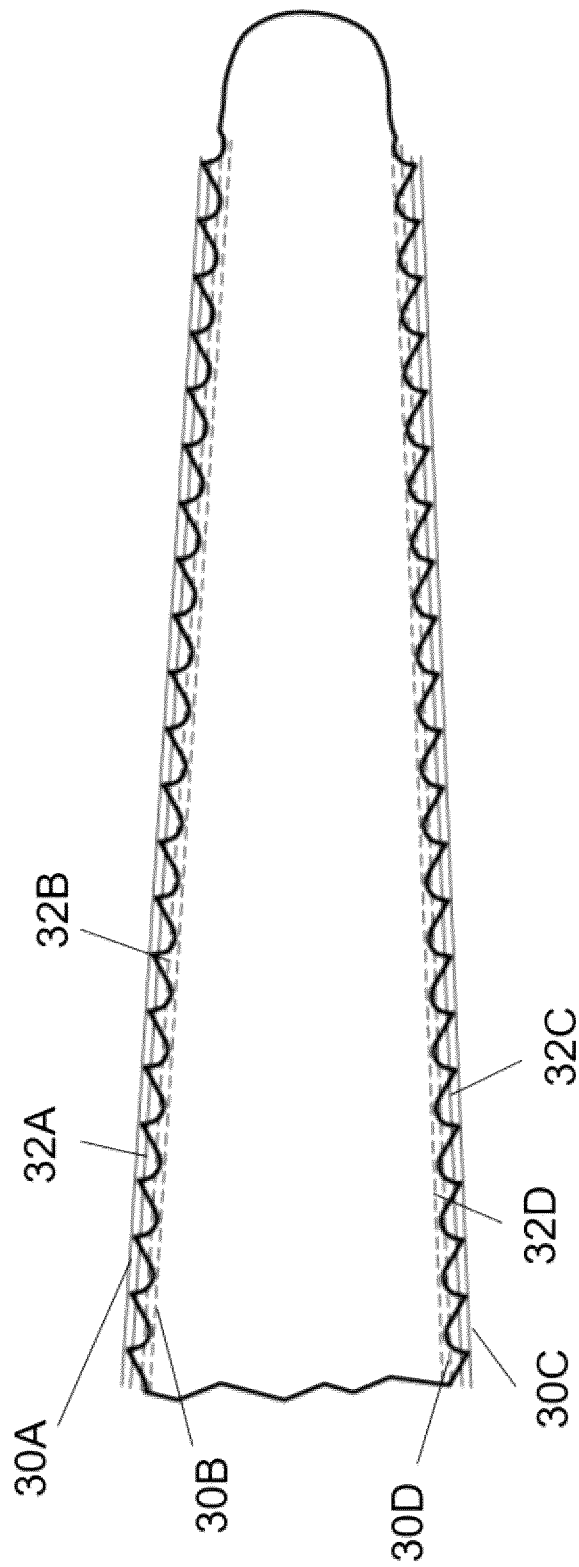
FIG. 10 illustrates the inspection of a rasp, in according with another embodiment.

With reference to FIG. 10, four nominal profiles (or lines) are provided, respectively labeled 30A-D. Each nominal profile is associated with a corresponding tolerance band 32A-D.

Once the measurement points, which are associated to crests or roots, have been located, a step of characterizing the crests or the roots can be achieved. Such characterizing can include, but is not limited to checking tooth pitch, tooth spacing, tooth height, major and minor diameters, and/or any other relevant properties. If combined with the use of a rotary stage, the method can be adapted to calculate part 20 runout using the crests and roots. This step can be referred to as an analysis of the results.

In some embodiments, the previous steps can be used for auto-aligning the image of the part 20 with the reference drawing. It is to be noted that that once the crest and root points have been located, they can be used as a complementary module to existing solutions. In one embodiment, the steps can be carried out to translate and rotate the reference drawing (e.g., CAD drawing) so as to best fit, without limitation, the crests and the roots to the tolerance band or to minimize the sum of the squared distance of all of the crests and roots on the part 20 to the nominal lines on the CAD drawing.

In some embodiments, the method can be adapted for parts that are larger than the field-of-view of the camera or the device capturing the image of the part 20 meaning that the techniques being herein described is in no way limited to the camera's field-of-view. In some embodiments, an encoded stage for moving the part 20, either manually or using motors, can be used, thereby allowing inspecting parts that are larger than the field-of-view.

In some embodiments, the method is executed in software. This software can work, for example and without being limitative with the same CAD files presently supported by VisionGauge®. In some implementations, a user could setup the required tolerances for the entities through a user interface. The software can be adapted to allow the use of uniform or linearly variable tolerances or any other forms of tolerance variation. Also, plus/minus tolerances, plus/plus tolerances, minus/minus tolerances or any other tolerances that can be useful in the context of inspecting parts having teeth are supported. In some implementations, the tolerances can be read-in directly from the CAD files.

The method or at least some of the steps thereof can be executed by a processor. The processor can be part 20 or connected to a system for determining compliance of a part 20 having teeth, crests and roots with a reference drawing. In one nonlimitative example, the system may further include non-transitory computer readable storage medium having stored thereon computer executable instructions for determining compliance of a part 20 having teeth with a reference drawing, the computer executable instructions, when executed by a processor having received an image of the part 20 cause the processor to overlay the image of the part 20 with the reference drawing, provide a plurality of measurement points on the image of the part 20, each being associated with a corresponding crest or root of the teeth and compare the image of the part 20 to the reference drawing to determine if the part 20 is within a predetermined tolerance at each measurement point. It will be readily understood that the reference to a processor, processing module or processing unit in the singular is not meant to exclude systems including a plurality of components collaborating together to accomplish the desired processing function. Various embodiments of the processors are known in the art.

The method having been herein described can also be carried out using a digital optical comparator. Such a digital optical comparator has a holder for the part 20 under study. A light source can be used illuminate the part 20 and casts an image of the part 20 onto a camera or a similar device. The camera can be provided with optical components, such as for example, a lens. The image captured by the camera can be displayed on a screen, and a drawing of the part 20 can thus be overlaid on the displayed image of the part 20 Thus, defects in manufacturing can be easily and readily identified in the crests and roots region, as it has been previously described. In addition, a determination of whether the part 20 is manufactured within tolerances can also be visually and/or automatically determined.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the current description.

The invention claimed is:

1. A method for determining compliance of a part with a reference drawing and according to a predefined tolerance, the part having an uneven profile comprising roots and crests, the method comprising:
    providing an image of the part;
    overlaying the image of the part with the reference drawing;
    aligning the reference drawing with the image of the part;
    determining, on the image of the part, a position of at least one of the roots and crests along the uneven profile of the part;
    associating each position of said at least one of the roots and crests with a corresponding measurement point; and
    for each measurement point:
    determining a distance between the image of the part and the reference drawing;
    determining whether the distance falls within the predefined tolerance; and
    outputting the outcome of the determination.

2. The method of claim 1, wherein said aligning the reference drawing with the image of the part comprises correcting a translation or a rotation of the reference drawing.

3. The method of claim 1, wherein said aligning the reference drawing with the image of the part is carried out by considering one or multiple datums.

4. The method of claim 1, wherein said aligning the reference drawing with the image of the part is achieved by
    carrying out an overall best-fit; or
    minimizing the distance between the reference drawing and the image of the part, according to a least square regression model; or both.

5. The method of claim 1, wherein said aligning the reference drawing with the image of the part comprises;
    fitting at least some of the roots and crests within the predefined tolerance on the reference drawing; or minimizing a maximal deviation between the roots or crests and the reference drawing; or both.

6. The method of claim 1, further comprising refining an alignment of the reference drawing with the image of the part, based on a position of the reference drawing relative to the roots or the crests only.

7. The method of claim 1, wherein the distance between the image of the part and the reference drawing is measured between an edge of the part and a corresponding nominal position of the part.

8. The method of claims 1, wherein the reference drawing comprises one or more nominal profiles, wherein each nominal profile is associated with tolerance bands; and wherein each tolerance band comprises plus-minus tolerances, plus-plus tolerances, minus-minus tolerances, or any combinations thereof.

9. The method of claim 8, wherein the tolerance bands are constant or vary along the uneven profile of the part.

10. The method of claim 9, wherein the tolerance bands vary linearly along the uneven profile of the part.

11. The method of claims 1, further comprising filtering artefacts based on a predetermined criterion, and wherein artefacts comprise at least one of: electronic noise, contamination, and false peak.

12. The method of claim 1, wherein the predefined tolerance is extracted from the reference drawing or provided by a user.

13. The method of claim 1, wherein the outcome of the determination is provided in real-time, near real-time, on a single image, on a series of images, or on a live video stream.

14. The method of claim 1, further comprising displaying, on the image of the part, the measurement points associated with said at least one of the roots and crests.

15. The method of claim 1, further comprising displaying, on the image of the part, the determined distance between the image of the part and the reference drawing.

16. A method for determining compliance of a part with a reference drawing and according to a predefined tolerance, the part having an uneven profile comprising roots and crests, the method comprising:
providing an image of the part;
overlaying the image of the part with the reference drawing;
aligning the reference drawing with the image of the part;
determining, on the image of the part, a position of at least one of the roots and crests along the uneven profile of the part;
associating each position of said at least one of the roots and crests with a corresponding measurement point;
for each measurement point:
determining a distance between an edge of the part on the image and a part's corresponding nominal position provided in the reference drawing;
refining an alignment of the reference drawing with the image of the part, based on a position of the reference drawing relative to said at least one of the roots and crests only;
determining a distance between the edge of the part on the image and the part's corresponding nominal position, after said refining the alignment;
determining whether the distance falls within the predefined tolerance; and
outputting the outcome of the determination; and
characterizing one or more properties of said at least one of the roots and crests;
outputting an overall pass-or-fail determination, the overall pass-or-fail determination being based on a combination of the outcome of the determination made for each measurement point or said one or more properties of said at least one of the roots and crests; and
displaying the overall pass-or-fail determination.

17. The method of claim 16, wherein said one or more properties comprise at least one of tooth pitch, tooth spacing, tooth height, major diameter of the part and minor diameter of the part.

18. A system for comparing a part with a reference drawing, the part having an uneven profile including roots and crests, the system being configured for providing an image of the part, the system comprising a processor configured for determining compliance of the part with the reference drawing according to a predefined tolerance, the processor being configured for:
overlaying the image of the part with the reference drawing;
aligning the reference drawing with the image of the part;
determining, on the image of the part, a position of at least one of the roots and crests along the uneven profile of the part;
associating each position of said at least one of the roots and crests with a corresponding measurement point; and
for each measurement point:
determining a distance between the image of the part and the reference drawing;
determining whether the distance falls within the predefined tolerance; and
outputting the outcome of the determination.

* * * * *

UNITED STATES PATENT AND TRADEMARK OFFICE
CERTIFICATE OF CORRECTION

PATENT NO. : 12,141,961 B2  
APPLICATION NO. : 17/776196  
DATED : November 12, 2024  
INVENTOR(S) : Patrick Beauchemin Page 1 of 1

It is certified that error appears in the above-identified patent and that said Letters Patent is hereby corrected as shown below:

In the Claims

Column 16, Line 34:
Claim 5, Please remove "comprises;" and insert --comprises:--.

Column 16, Line 47:
Claim 8, Please remove "of claims 1," and insert --of claim 1,--.

Column 16, Line 57:
Claim 11, Please remove "of claims 1," and insert --of claim 1,--.

Signed and Sealed this
Twenty-seventh Day of May, 2025

Coke Morgan Stewart
*Acting Director of the United States Patent and Trademark Office*